Sept. 11, 1923.
A. R. BECKERT
1,467,972
SUPPORTING DEVICE FOR NEEDLES OR POINTERS
Filed Dec. 20, 1921
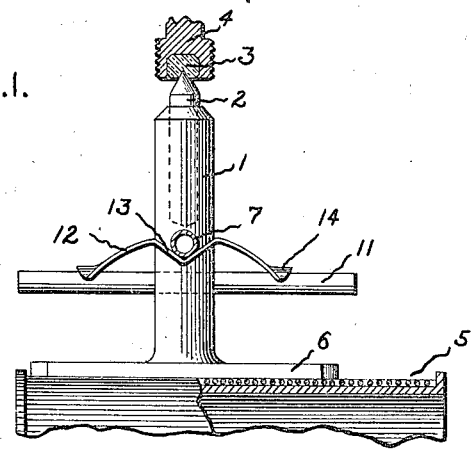
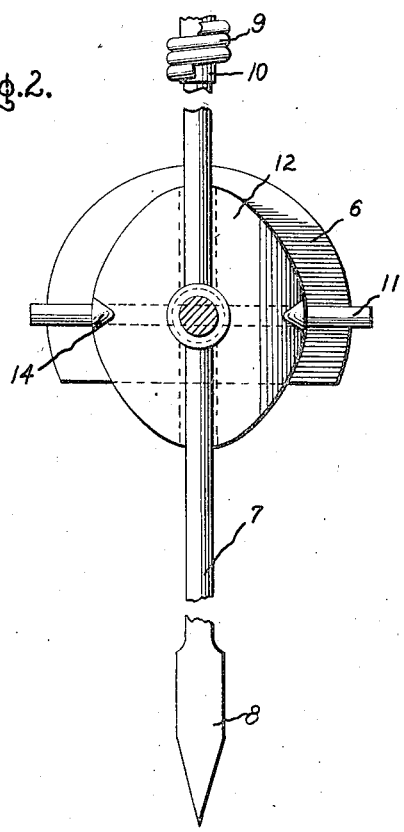
Inventor:
Albert R. Beckert,
by *[signature]*
His Attorney Patented Sept. 11, 1923.

1,467,972

UNITED STATES PATENT OFFICE.

ALBERT R. BECKERT, OF LYNN, MASSACHUSETTS, ASSIGNOR TO GENERAL ELECTRIC COMPANY, A CORPORATION OF NEW YORK.

SUPPORTING DEVICE FOR NEEDLES OR POINTERS.

Application filed December 20, 1921. Serial No. 523,770.

*To all whom it may concern:*

Be it known that I, ALBERT R. BECKERT, a citizen of the United States, residing at Lynn, in the county of Essex, State of Massachusetts, have invented certain new and useful Improvements in Supporting Devices for Needles or Pointers, of which the following is a specification.

My invention relates to the mounting of instrument pointers and the like, and its principal object is to provide an improved support between such a pointer and the shaft on which it is mounted whereby the pointer is firmly held and yet is easily adjustable. Another object of my invention is to combine with my improved support, means for adjusting the balance of the shaft.

In galvanometers and other instruments of like nature it is important that the parts carried by a pivoted shaft be perfectly balanced in order to insure accuracy where the instrument is used with the moving axis in other than a vertical position. Where the pivoted shaft carries a moving coil or equivalent element it is often difficult and in some cases undesirable to perfectly balance the same so that its center of gravity will fall in the axis. The final balancing of the shaft must come after the parts are assembled in the instrument because the pointer may need to be angularly adjusted relative to the coil and radially adjusted relative to the shaft in order to properly cooperate with the scale. My invention enables this final balancing adjustment to be quickly and accurately made without dismantling the parts and furthermore provides a long bearing surface between the pointer and shaft whereby the pointer together with the balancing means are firmly held in their adjusted positions.

The novel features of my invention will be pointed out in the appended claims. The details of construction and manner of applying my invention will be understood by a reference to the following description, taken in connection with the accompanying drawings which show the preferred embodiment thereof, and in which Fig. 1 illustrates a portion of an instrument shaft to which my invention is applied and Fig. 2 a top plan of the same.

Referring now to the figures in which like parts are indicated by like numerals throughout, 1 indicates a shaft constituting the upper end of the moving element of an electric instrument. The upper end of the shaft is provided with a removable pivot 2 cooperating with a jeweled bearing 3 held in a stationary plug 4 which is secured in any suitable manner to the stationary part of the instrument casing not shown. The shaft is secured to the coil 5, constituting the moving coil of an electrical instrument, by means of the supporting piece 6. The lower end of this coil has not been shown but it will be understood that it is supported in a similar manner as the upper end. Near the upper end of the shaft 1 is an opening passing through its axis at right angles, and freely held in this opening is a pointer 7 with its short end extending some distance through the shaft. The pointer 7 is preferably made hollow in order that it will be as light as possible. One end 8 of this pointer is adjusted to cooperate with a stationary scale not shown. The opposite end extends some distance through the shaft 1 and preferably carries an adjustable weight 9 made of a few turns of wire mounted on a sleeve 10. The weight thus formed grasps the sleeve and pointer with sufficient force to frictionally hold the same in any position on the pointer 7 to which it may be adjusted, and it may thus be moved back and forth to counterbalance the weight of the indicating end of the pointer and assist in balancing the parts carried by the shaft 1. Just below the opening which holds pointer 7 is a similar opening at right angles thereto which carries a rod 11. This rod may be, and preferably is, adjustable through the shaft 1 for the purpose of balancing the moving element of the instrument. A resilient disc 12 having a central opening through which the shaft 1 freely passes, is provided between the pointer and rod for securely holding the pointer 7 and the rod 11, if the latter is movable, in adjusted positions, the outer surfaces of the bores in the shaft 1 constituting abutments against which the pointer 7 and rod 11 are pressed by the resilient member 12. The disc is preferably made in the shape of an oval saucer with a V-shaped groove 13 across its long diameter in the convex surface to receive and hold the pointer 7. The outer edge of this disc is preferably provided with notches on the opposite side from the groove 13 as indicated at 14 and on a line at right angles to the groove 13 to receive and hold the rod 11.

When the disc 12 is in the position shown it is under sufficient compression to firmly hold the pointer and rod in any position to which they have been adjusted with respect to the shaft, the pointer 7 and the rod 11 tending to flatten the disc from its saucer shape. The V-shaped groove 13 provides a long bearing surface for the pointer 7 and relieves the same from strains tending to break it off adjacent the shaft, such as would be caused by a sudden angular movement of the shaft 1. After the parts are assembled the pointer 7 may be easily adjusted radially the proper amount to co-operate with the stationary scale. Then the entire movable element may be readily and quickly balanced by adjusting the weight 9 and the rod 11 radially with respect to the shaft 1. These two adjustments being at right angles to each other means that any unbalancing of the coil 5 may be readily compensated for irrespective of its angular position with respect to the pointer. A screw driver or other instrument is not required for making these adjustments and no loose parts such as screws or pins are used. The invention thus affords a simple and inexpensive means of quickly and accurately adjusting for balance at the same time the pointer is adjusted relative to the scale.

Various modifications may be made without departing from the scope of the invention. The exact shape and nature of the resilient member 12 is quite immaterial. In certain cases the adjustable rod 11 might be replaced by a non-adjustable abutment and I might provide one or more sliding weights similar to the one shown at 9 on the arms of the rod 11 for balancing purposes.

While I have thus described my invention in connection with an electrical instrument it will be understood that the same might be used in any other kind of instrument or apparatus where similar conditions are encountered.

In accordance with the provisions of the Patent Statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an instrument, a shaft constructed to provide axially spaced abutments, an adjustable pointer and a resilient member having a central opening for the shaft and provided with a long bearing surface for said pointer, said pointer and member being held between said abutments with the resilient member under compression to securely hold said pointer in adjusted position.

2. In an instrument, a shaft, constructed to provide an abutment, a pointer adjustably held against said abutment, a resilient disc-shaped member on said shaft having a long bearing surface on one side adapted to receive said pointer and hold it against said abutment, and means adapted to bear against the other side of said member on another diameter thereof and press it against said pointer.

3. In an instrument, a shaft provided with an opening, a pointer adjustably held in said opening, a rod extending through said shaft adjacent and at right angles to said pointer and means for holding said pointer in adjusted position comprising a resilient, saucer-shaped, disc provided with a central opening for said shaft, a groove in its convex surface for receiving said pointer and notches in its outer edge for receiving said rod, adapted to be compressed between said pointer and rod.

In witness whereof, I have hereunto set my hand this 14th day of December, 1921.

ALBERT R. BECKERT.